US006512025B2

(12) United States Patent
Choudhery

(10) Patent No.: US 6,512,025 B2
(45) Date of Patent: *Jan. 28, 2003

(54) DISPERSION PROCESS

(75) Inventor: Riaz Ahmad Choudhery, Solihull (GB)

(73) Assignee: Imperial Chemical Industries PLC, Millbank (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/777,700

(22) Filed: Feb. 7, 2001

(65) Prior Publication Data

US 2001/0012863 A1 Aug. 9, 2001

Related U.S. Application Data

(63) Continuation of application No. 09/180,566, filed as application No. PCT/EP97/02841 on May 26, 1997, now Pat. No. 6,204,310.

(30) Foreign Application Priority Data

May 26, 1996 (GB) .............................................. 9611118

(51) Int. Cl.$^7$ ............................................... C08L 21/12
(52) U.S. Cl. ........................ 523/348; 524/611; 524/612
(58) Field of Search ........................ 523/348; 524/611, 524/612

(56) References Cited

U.S. PATENT DOCUMENTS

| | | | |
|---|---|---|---|
| 4,122,055 A | 10/1978 | Tugukuni et al. | 260/29.4 |
| 4,564,648 A | 1/1986 | Huybrechts et al. | 523/423 |
| 4,644,028 A | 2/1987 | Fischer et al. | 524/376 |
| 5,055,516 A | 10/1991 | Fisch et al. | 524/541 |
| 5,087,645 A | 2/1992 | Kojima et al. | |
| 5,096,556 A | 3/1992 | Corrigan et al. | 204/181.7 |
| 5,135,963 A | 8/1992 | Haeberle | 522/84 |
| 5,300,556 A | 4/1994 | Tirpak et al. | 524/591 |
| 5,354,804 A | 10/1994 | Inada et al. | |
| 5,461,089 A | 10/1995 | Handyside et al. | |
| 5,508,340 A | 4/1996 | Hart | 524/591 |
| 5,521,246 A | 5/1996 | Tien et al. | 524/507 |
| 5,552,477 A | 9/1996 | Dhein et al. | 524/840 |
| 5,563,206 A | 10/1996 | Eicken et al. | 514/590 |
| 5,614,584 A | 3/1997 | Schwan et al. | 524/591 |
| 5,854,332 A | 12/1998 | Swarup et al. | 524/507 |
| 5,965,213 A | 10/1999 | Sacharski et al. | 427/475 |
| 5,977,215 A | 11/1999 | Tien et al. | 523/415 |
| 6,204,310 B1 * | 3/2001 | Choudhery | 523/348 |

FOREIGN PATENT DOCUMENTS

| | | |
|---|---|---|
| GB | 947050 | 1/1964 |
| GB | 1087626 | 10/1967 |

* cited by examiner

Primary Examiner—Edward J. Cain
(74) Attorney, Agent, or Firm—Morgan, Lewis & Bockius LLP

(57) ABSTRACT

A continuous process is disclosed for preparing a reactive particulate dispersion in a liquid carrier. The process comprises mixing together as a melt a resin and a crosslinker under extrusion condition at a temperature and for a time such that substantial crosslinker potential is retained between the resin and the crosslinker and thereafter dispersing the mixture whilst still molten into the liquid carrier and allowing the molten dispersed mixture to solidify to form particles.

15 Claims, 1 Drawing Sheet

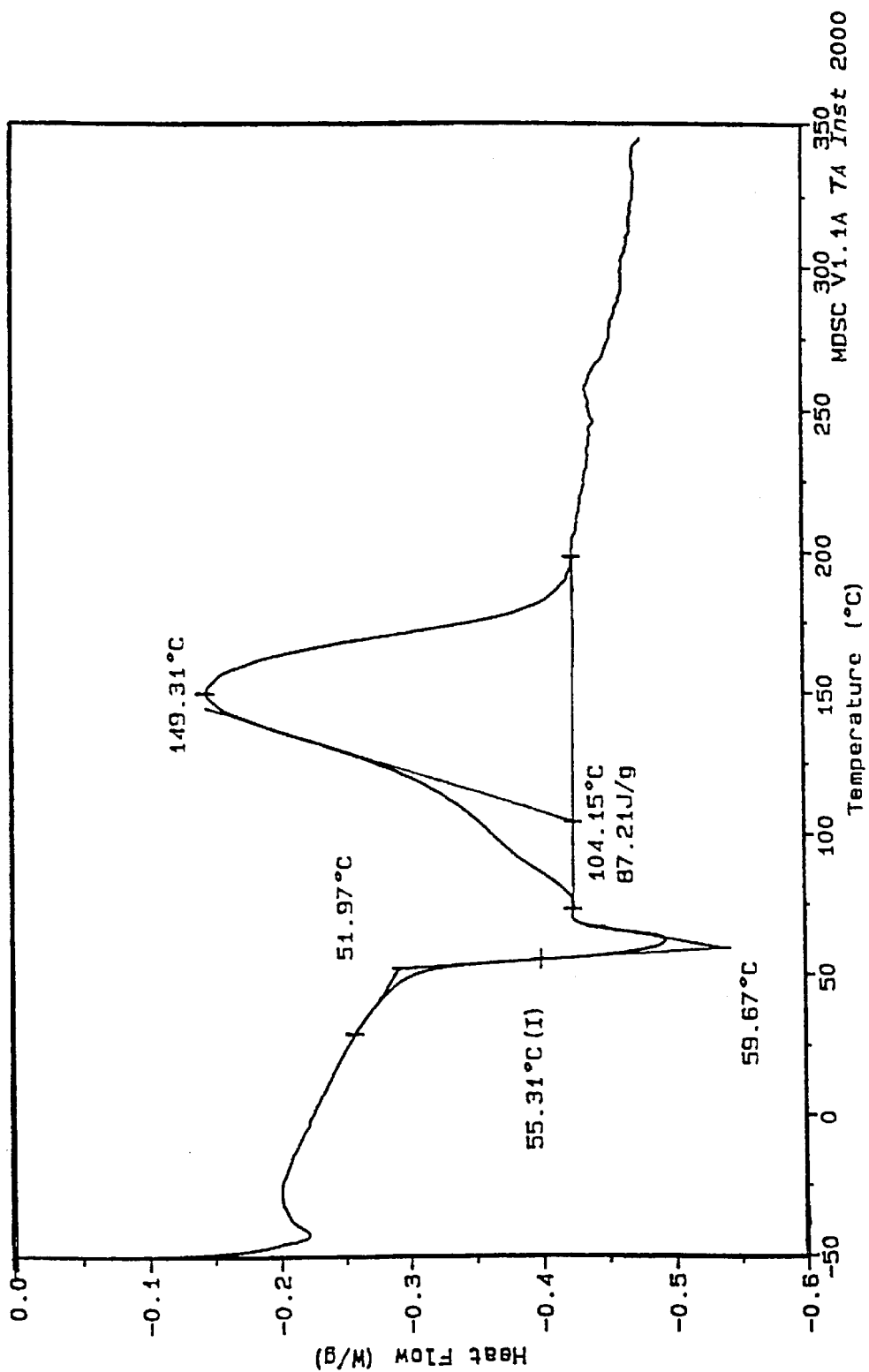

DISPERSION PROCESS

This is a continuation of application Ser. No. 09/180,566, filed Nov. 6, 1998, now U.S. Pat. No. 6,204,310, a 35 USC 371 national filing based on PCT/EP97/02841, filed May 26, 1997, the benefit of which is claimed.

This invention relates to a process for preparing reactive particulate dispersions and reactive powders, in particular a process for manufacturing aqueous dispersions of suspended particulates in a continuous process.

A reactive particle consists of a resin (that is to say a natural or synthetic polymer having reactive functional groups) and a crosslinker (that is to say a monomer, an oligomer or other polymer having reactive functional groups capable of reacting with the reactive functional groups on the resin) which can be reacted together to form a crosslinked network. In a reactive particle a proportion of the functional groups in the resin and the crosslinker will be un-reacted, and be capable of undergoing crosslinking reactions with functional groups in resin and crosslinker molecules in the same or other reactive particles. It is also a feature of such particles that they will be an intimate mixture of ingredients, with each particle having essentially the same composition.

Reactive particulate dispersions are typically used in the preparation of coating compositions where, following application to a surface to be coated, any carrier liquid is either allowed to evaporate, or will be driven off, and the particles caused to form a crosslinked film, for example by stoving. Reactive powders are used in powder-coatings where the dry powder is applied to a surface to be coated, and then caused to crosslink in the same way.

Conventionally, powder coatings are prepared by melting together a resin and a crosslinker for a time and at a temperature such that no substantial reaction takes place between them. The melt is then extruded, allowed to solidify as a mass, and the solid extrudate is then pulverised, with the powder so obtained then being classified. Such a powder can be applied directly or as a dispersion in a liquid carrier. However, a problem with such processes is the need for the grinding and classification steps, which are relatively expensive. In particular, the grinding step requires the use of expensive cooling equipment, particularly with low Tg polymers, to ensure both that the temperature of the resin does not exceed that at which further reaction may occur, and also to ensure that the resin remains brittle, in order that satisfactory particle size reduction can occur.

It is also a disadvantage of such a process that the resin particles so produced tend to have irregular particle shapes and sizes, and that there is poor control over these parameters. Regular particle shape and size is advantageous, as is the provision of substantially spherical particles, since such particles can have advantages in terms of their ability to retain electrostatic charge when they are used in particle coatings. They can also be more fluidizable.

It is also known to produce certain types of dispersions for use as water based paints. For example, U.S. Pat. No. 5,087,645 (Toyo Seikan Kaisha Ltd.) discloses a batch process for producing a water based paint composition which comprises an epoxy resin, a curing agent and an acrylic resin, wherein the acrylic resin has an acid number between 2 and 30, and wherein the acrylic resin has been modified by converting the carboxyl groups on it to amine or ammonium salts, by the addition of an aqueous solution of ammonia or an amine. The resulting solution undergoes phase inversion to provide the water based paint.

We have now discovered that reactive dispersions and powders can be made much more simply, from a wider range of materials, and to a higher degree of uniformity by a melt/dispersion process which is carried out on a continuous basis (i.e. preferably in an extruder), and also has certain other advantageous aspects.

Accordingly the present invention provides a continuous process for preparing a reactive particulate dispersion in a liquid carrier which process comprises mixing together under extrusion conditions to form a molten mixture a resin and a crosslinker under shear at a temperature and for a time such that substantial crosslinking potential is retained between the resin and the crosslinker, and thereafter dispersing the mixture whilst still molten into a liquid carrier, and allowing the molten dispersed mixture to form particles.

By carrying out the process under extrusion conditions, this allows the operator to heat and mix rapidly the components of the composition, but also to rapidly cool the mixture once an intimate blend is attained, thereby minimising the extent of reaction that occurs. It is highly preferred that the reaction is carried out in an extruder, and also highly preferred that the extruder is a twin screw extruder, to ensure that the desired temperature control and intimate mixing is achieved.

According to a further aspect of the invention, there is provided a continuous process for preparing a reactive particulate dispersion in a liquid carrier in an extruder equipped with a main intake, an exit port, and an intermediate liquid injection port between the main intake and the exit port, and heating means for heating material as it passes through the extruder between the main intake and the liquid injection port, in which a resin and a cross linker are introduced into the extruder through the main intake, and are heated and mixed together as they pass through the extruder so as to form a molten mixture before they reach the liquid injection port, and a liquid carrier is introduced into the extruder through the injection port, and the molten mixture becomes dispersed in the liquid medium, the temperature and the throughput of the extruder being such that substantial crosslinking potential between the resin and the crosslinker remains in the final dispersion, and the dispersion is allowed to cool on leaving the extruder such that the molten mixture solidifies to form a particulate dispersion.

Preferably, where the reactive particulate dispersion is intended for use as a coating composition, other coating composition components such as pigments, flow agents and catalysts can be introduced into the main intake at the same time as the resin and the crosslinker. Preferably the components are subjected to a short physical pre-mixing step at ambient temperature prior to being introduced to the extrusion conditions. Also, where a dispersion agent is used, it is preferred that this is introduced into the injection port at the same time (e.g. predispersed) with the liquid carrier.

A highly preferred aspect of the process according to the present invention is that it can be carried out without the addition of, and in the absence of any solvents which are capable of dissolving the resin in the composition, such as volatile organic solvents. This provides a clear advantage of the process over other known processes, such as for example that described in the above mentioned U.S. patent (which in practice requires the use of volatile organic solvents). In particular, the use of such solvents can cause the Tg of the resin to decrease, and also decreases the blocking temperature of the final powder composition. This can lead to unacceptable agglomeration of the resin in the powder state, making it less suitable for use. Preferred coating compositions do not contain any solvent which is capable of dissolving the resin in the composition, and also have not had any such solvent used in their manufacture, as in practice if such a solvent has been used in their manufacture, some is inevitably retained in the resin. This leads to the undesirable attributes described above. As such, preferably the blocking temperature of the resin powder which can be isolated from the dispersion produced according to the invention is at least is 40° C.

Consequently, it is preferred that the liquid carrier used for the dispersion step is not capable of dissolving the resin in the composition, and is therefore immiscible with the polymer components of the reaction mixture. The use of such an immiscible liquid carrier would not significantly reduce the viscosity of the polymer in the dispersion being processed, and also would not significantly affect the Tg of the dispersed polymer resin.

An advantage of the process according to the invention is that it provides for the preparation of polymer dispersions that have a higher reactivity (i.e. pre-disposition towards cross-linking) than other known dispersions. The resulting polymer dispersions, which can be dried by removal of the carrier liquid, also provide free flowing powders and can provide powders which have substantially spherical particles. This first characteristic is a function of the process being used to produce the polymer not involving any volatile organic compounds or solvents which are miscible with the polymer.

An important feature of the process according to the invention is the selection of the appropriate process conditions in the extrusion process, which is preferably carried out in an extruder and more preferably a twin screw extruder, so as to provide a polymer dispersion which has a relatively high reactivity. This can be established by routine experimentation, but as a generalisation the temperature of processing in an extruder can be higher than could for example be used in the process according to U.S. Pat. No. 5,087,645, but should not be so high as to cause the polymer to react excessively so as to deplete the reactivity of the polymer. The processing temperature can also be controlled in conjunction with the residence time in the extruder, again so as to optimise the conditions for the production of the polymer.

Advantages accrue to the continuous (i.e. single step) process of the invention in this respect, since the use of an extruder to provide a continuous process provides better control over the process parameters so as to optimise the properties of the polymer dispersion. The use of an extruder also means that under the intimate conditions of shearing, and rapid homogenisation which occurs, residence times and reaction temperatures can be minimised so as to minimise the unwanted reaction, and maximise the degree of residual reactivity of the polymer during production of the dispersion. Conveniently, the step of introducing an immiscible carrier liquid to provide the polymer dispersion can act as a cooling step at the end of the process.

A further advantage of the process according to the invention is that the particles of dispersed polymer produced tend to be substantially spherical. This is in contrast to the relatively irregular acicular particle shape produced in a grinding and classifying regime.

The particles produced in the process according to the invention are typically in the range 1–50 microns, which makes them particularly suitable for use in the production of powder coatings.

With regard to suitable polymers, in principle any resin/crosslinker system that can be used to make powder coatings can be used in the process of this invention. Examples of such systems are acid/epoxy systems, acid anhydride/epoxy systems, epoxy/amino resin systems, polyphenol/epoxy systems, phenol formaldehyde/epoxy systems, epoxy/amine systems, epoxy/amide systems, isocyanate/hydroxy systems, carboxy/hydroxyalkylamide systems and hydroxyl/epoxy systems. Optionally the systems can also contain a catalyst or blocking groups. Such systems are described in Powder Coatings Chemistry and Technology, T. A Misev, John Wiley & Sons Ltd 1991.

In a polyphenol/epoxy system the resin generally consists of a polybisphenol A resin which has a molecular weight in the range 1,000 to 20,000, more particularly 1,000 to 10,000 and especially 1,000 to 4,000. Examples of such resins are Araldite resins which are commercial available. Particular resins are Araldite GT-7072 and Araldite GT-7220. In such systems the crosslinker is a polyepoxide. This will have a molecular weight in the range 1,000 to 10,000, particularly 1,000 to 4,000. In particular it will also be a novolac-type polyepoxide. Novolac polyepoxides are commercially available. Polyphenol/epoxy systems can be catalysed with for example 2-methyl imidazole.

In an isocyanate/hydroxy system the hydroxy resin can be an hydroxy functional polyester or an hydroxy functional acrylic resin.

Hydroxyl functional polyester polymers have units derived from one or more polybasic acids and units derived from one or more polyhydroxy compounds.

Polybasic acids are compounds having two or more carboxylic acid groups or an equivalent number of anhydride groups (on the basis that one anhydride group is equivalent to two acid groups). Such polybasic acids are well known in the polyester art. Examples of suitable polybasic acids are $C_{1-6}$ alkane dioic acids such as adipic acid or hexanedioic acid, cycloaliphatic acids such as hexahydrophthalic acid, unsaturated alkane dioic acids such as fumaric or maleic acids, dimer acids, and aromatic acids such as phthalic acid. Their equivalent anhydrides such as maleic anhydride or phthalic anhydride can also be used.

Polyhydroxy compounds are compounds having two of more hydroxyl groups and are well known in the polyester art. Examples of suitable polyhydroxy compounds are trimethylol propane, glycerol, neopentyl glycol and pentaerythritol.

The hydroxy functional polyester polymer are commercially available (eg Uralac P2115 and P2504 from DSM Resins BV) and can be produced by known methods.

Hydroxy functional acrylic addition polymers are derived from polymerisable ethylenically unsaturated monomers such as vinyl or acrylic monomers and comprise functional units and structural units.

Whenever referred to herein, the term acrylic monomer refers to esters of acrylic or methacrylic acid. The term (meth) acrylate means acrylate and methacrylate. The term (meth) acrylic acid means acrylic and methacrylic acids. Functional units are derived from hydroxy functional vinyl or acrylic monomers. Examples of hydroxy functional acrylic monomers are hydroxyethyl (meth) acrylate, hydroxybutyl (meth) acrylate and hydroxypropyl (meth) acrylate. A preferred hydroxy functional monomer is 2-hydroxyethyl methacrylate.

Examples of other hydroxy functional monomers are the reaction products of glycidyl methacrylate with monocarboxylic acids.

Structural units are derived from monomers which do not have hydroxyl groups and will not react with the crosslinker. Examples are non-functional vinyl monomers and alkyl esters of (meth) acrylic acid. Examples of non-functional vinyl monomers are styrene and 2-phenyl propene. Examples of alkyl esters of (meth) acrylic acid are $C_{1-12}$ alkyl esters such as methyl (meth) acrylate, ethyl (meth) acrylate, n-butyl (meth) acrylate, t-butyl (meth) acrylate and n-propyl (meth) acrylate.

Examples of an hydroxy functional acrylic addition polymer are Elvacite 2810 (Mn 7000, OH value 64 mg KOH/1 g resin; from ICI) and Neocryl XB-1264 (Mn 8000–12000, OH value 80 mg KOH/1 g resin; from Zeneca).

Isocyanate crosslinker can be di-, tri-, or poly- aliphatic or aromatic isocyanates and adducts between such isocyanates and low molecular weight polyols.

Examples are hexamethylene diisocyanate, isophorone diisocyanate, toluene diisocyanate and 4,4-diphenylmethane diisocyanate. The isocyanate group in the diisocyanates can be protected or blocked for example by a caprolactam blocking group commercially available under the trade mark Vestagon from Hüls.

Polyisocyanates include biuret isocyanurate trimers, allophonates and uretdiones of the diisocyanates listed above. Particular examples are hexamethylene diisocyanate biuret, isocyanurate, allophonate and uretdione/ isocyanurate; isophorone diisocyanate isocyanurate and allophonate.

Examples of the low molecular weight polyols that can be used to make isocyanate/polyol adducts are trimethylol propane, glycerol and pentaerythrithol. The isocyanate crosslinkers described above are known and can be made by known methods. Many are commercially available under the trade mark Desmodur.

In an hydroxyalkylamide/carboxy system the carboxy resin can be a carboxy functional polyester or carboxy functional acrylic resin.

Carboxy functional polyester polymers have units derived from one or more polybasic acids and units derived from one or more polyhydroxy compounds. Resins of this type have been described above with reference to the isocyanate/hydroxy system.

The carboxy functional polyester polymer are commercially available (eg Uralac P2127 from DSM Resins BV) and can be produced by known methods.

Carboxy functional acrylic addition polymers are derived from acrylic and methacrylic acids themselves and structural units.

Structural units are derived from monomers which do not have carboxyl groups and will not react with the crosslinker. Examples as described above with reference to the isocyanate/hydroxy system. An example of a carboxy functional acrylic resin is Elvacite 2776 available from ICI and has a Mn of 8000 and acid value of 85 mg KOH/1 g of resin.

An example of an hydroxyalkylamide is Primid XL552 available from Rohm and Haas.

In an acid/epoxy system the epoxy resin can be an aromatic or aliphatic epoxy resin, in particular it can be a glycidyl functional acrylic resin.

Glycidyl functional acrylic addition co-polymers are derived from polymerisable ethylenically unsaturated monomers such as vinyl or acrylic monomers and comprise functional units and structural units.

Functional units are derived from glydicyl acrylate and methacrylate.

Structural units are as discussed above with reference to the isocyanate/hydroxy system. An example of a glycidyl functional acrylic resin is Almatrex available from Zeneca.

Acid crosslinkers can be $C_6$–$C_{18}$ alkanedioic acids. Examples include dodecane-1,12-dioic acid and sebacic acid.

Suitable amino resins include melamine formaldehydes, urea formaldehydes, benzoguanamines phenol formaldehydes and glycolurils.

Preferably, the resin and crosslinker are selected from epoxy, polyphenol, polyester, blocked isocyanate, hydroxyalkylamide crosslinker, amino resin, hydroxyl functional polymer and carboxy functional polymer or crosslinker.

More preferably, the resin and crosslinker are selected from epoxy, polyphenol, polyester and amino resin.

The liquid carrier for the dispersions of this invention is chosen having regard to the temperature at which the process is carried out as described below and such that for practical purposes it is un-reactive and imiscible with the particles produced. That is to say it does not react to any major extent with the particles either before the dispersion is applied as a coating composition or before the particles are separated from the liquid medium. Hence the choice of the liquid medium will depend on the composition of the particles and the use to which they will be put.

Where the particles comprise a polybisphenol-A/polyepoxide system, the liquid medium can be water or a liquid hydrocarbon, for example a liquid alkane, in particular, hexane, heptane or octane, but more particularly a high boiling alkane, for example nonane, decane, dodecane and isohexadecane.

Where the particle comprises an isocyanate and a polyol, the liquid medium can be water in which case the isocyanate should ideally be blocked.

The mixing step is carried out for a time and at a temperature such that substantial crosslinking potential is retained between the resin and the crosslinker. This is to be understood in a broad practical sense to mean that after mixing under shear and dispersing in the liquid medium, each particle still contains sufficient functional groups in the resin and the crosslinker to form crosslinked bonds with resin and crosslinker from other particles so as to form a crosslinked network.

Whether or not any particular dispersion meets this criterion can be determined by trial and error.

Usually, the particles will contain at least 20 mole % of un-reacted functional groups compared to the original level.

For example the particles will contain more than 30 or 40 mole % or preferably greater than 50 mole % of un-reacted functional groups compared to the original level.

The temperature at which the mixing is carried out depends upon the melting points or softening points of the resin and crosslinker, their mutual reactivity, the viscosity of the melt and the speed at which mixing and dispersion can take place.

The higher the temperature, the more rapidly will any reaction between the resin and the crosslinker take place, so the more rapidly must any mixing and cooling take place to ensure that the particle retains substantial crosslinking potential.

Accordingly, where for example a particle is to be made from a resin having a relatively high melting point, a slower reacting crosslinker should be selected; for example a crosslinker where the functional groups are protected by blocking groups or are sterically hindered. Alternatively the process can be carried out such that the dispersion is rapidly cooled so that the particles solidify and any crosslinking reaction is quenched.

The liquid carrier is chosen such that its boiling point is above the temperature at which the process is carried out, except where the process is carried out under pressure for example in an extruder.

Examples of typical lower operating temperatures are 50, 60 and 70° C. Examples of typical upper operating temperatures are 200, 250 and 300° C. More usually the temperature will be below 200° C. for example 100 to 150° C. However, a preferred temperature range is 70–150° C.

Examples of typical minimum mixing (i.e. processing) times are 15 and 20 seconds. Examples of maximum mixing times are 420, 480 and 600 seconds. Usually the mixing time is no less than 20 seconds and no more than 300 seconds. For example it is from 30 to 180 seconds. Preferably the processing time is in the region 20–240 seconds.

The step of dispersing the melt in the liquid medium is preferably carried out with the aid of a dispersant. Preferably, the steps of melting and mixing the resin and the crosslinker, and step of dispersing are carried out sequentially in a continuous process.

The dispersant helps to disperse the polymer melt in essence mainly by lowering the interfacial tension between the melt and the diluent and subsequently stabilising the dispersed particles or droplets in the liquid medium. The dispersant can be a block or graft copolymer comprising a stabilising component which is a soluble in the liquid medium and an anchor component which associates with or reacts with one or more components in the melt.

The nature of the stabilising component depends on the liquid medium. When the liquid medium is an aliphatic hydrocarbon, the stabilising component can be an hydrocarbon chain such as a polybutadiene chain. When the liquid medium is water the stabilising component can be a polyethylene glycol or polyvinyl alcohol.

The anchor component can be one which associates with the melt for example by physical absorbtion or reacts with one or more components in it.

Examples of anchor components are polar acrylate and methacrylate polymers, and moieties. Such dispersants are well known and can be made by known methods.

The process is controlled such that the size of the droplets of the melt and hence the particles are in the range from 0.1 to 80 microns, for example 0.1 to 20 microns or 2–50 microns. A preferred range is 1–30 microns.

The dispersions generally preferably comprise at least 15% by weight of particulate material, for example from 20 to 80% by weight and particularly from 20 to 60% by weight.

The process is carried out by melting the solid component (usually the resin) or components and mixing them together as a melt with the whole process being carried out in a one stage (i.e. single pass) process, for example in a single pass through an extruder. The dispersion part of the process can be carried out by either direct or inverse emulsification. In the inverse emulsification process, a small amount of carrier liquid medium and optional dispersant may be introduced and mixed in with the melt forming a dispersion of carrier liquid in the melt. This dispersion can then be inverted by adding more liquid through a further port, optionally with more dispersant, to form a dispersion of the melt in the liquid. Alternatively the dispersion can be prepared in a single step by directly adding a sufficient quantity of carrier liquid and dispersant, followed by mixing.

Preferably the process is carried out in an extruder, and in particular a twin-screw extruder. An example of such an extruder is the Leistritz co-rotating micro-18 GL 40D.

The dispersion so obtained can be used directly as a coating composition or the particulate material can be separated and used as a powder coating. Powder particles for powder coating are conventionally solids at room temperature. Hence the resin and crosslinker should be chosen so as to form a solid once they have been cooled following melt mixing. The particles can be separated by centrifugation, sedimentation, filtration or spray drying. Additionally, the isolated particles may be re-dispersed in another liquid medium and used as a liquid coating composition.

Since the particles have retained crosslinking potential, they can be used to form coatings by applying a mass to a surface for example by spraying or conventional powder application, allowing any liquid carrier to evaporate and stoving the mass to cause the particles to coalesce and to crosslink.

In a coating composition the dispersion or the powder can contain other additives standard for coating compositions for example pigments, flow aids and uv-stabilisers.

BRIEF DESCRIPTION OF THE DRAWING

The invention will now be further described with reference to the following examples and FIG. 1, which shows an example of a Differential Scanning Calorimeter trace for a polymer produced according to the invention.

EXAMPLES

Example 1

A solid blend of two different polybisphenol A resins [Araldite GT-7072 (49 parts) and Araldite GT-7220 (24 parts)] was prepared with a catalyst containing epoxy novolac resin [DEH82 epoxy novolac with 3.5% 2-methyl imidazole as catalyst (27 parts)], fed at 2 kg hr$^{-1}$ into the intake feed zone of a Leistritz twin-screw micro 18-GL 40D extruder and melt blended at 110° C. Downstream of the melt blend step, polyvinyl alcohol (KL-05 from Nippon Gohsei) and water (10% non.vol.) was injected at 0.5 kg hr$^{-1}$ into the melt via a liquid injection port whilst maintaining the temperature of the melt at 110° C., to form an inverse dispersion where water is the disperse phase. The inverse dispersion was cooled to 90° C. and then mixed with more water pumped into the extruder at 2 kg hr$^{-1}$ and extruded through the extruder die to produce an aqueous particulate dispersion. The volume average particle size of the dispersion was 7.7 micrometers, as measured by Malvern Mastersizer™.

Example 2

A solid particulate blend of hydroxy acrylic resin powder [Elvacite 2810 (70 parts)] and caprolactam-blocked isocyanate crosslinker [Vestagon B1530 (30 parts)] was fed at 1 kg hr$^{31\ 1}$ into the intake feed zone of a Leistritz twin-screw micro 18-GL 40D extruder and melt blended at 150° C. Downstream of the melt blend step, styrene/ethyl acrylate/methacrylic acid 40:30:30 latex co-polymer (see Example 4 for preparation method) in water (30% non.vol.) was injected at 0.6 kg hr$^{-1}$ followed by ammonium hydroxide solution (1.4M) at 0.7 kg hr$^{-1}$ into the melt via sequential liquid injection port whilst maintaining the temperature of the melt at 150° C., to form a dispersion which is thereafter cooled to 90° C. and diluted with more water pumped into the extruder at 1.3 kg hr$^{-1}$ and extruded through the extruder die to produce an aqueous particulate dispersion.

The particulate dispersion so obtained was spray dried using a Büchi Spray Dryer to yield a free flowing powder (with a volume average particle size of 20.2 microns).

Example 3

The following aqueous dispersions were made according to the protocol described in Example 1 above, but using the following processing conditions and polymer compositions.

| Comp. | Polymer composition | Extruder screw speed (rpm) | Temp. (° C.) |
|---|---|---|---|
| 1 | Uralac P2127 (50 parts)/ Araldite G7004 (50 parts) | 250 | 110 |
| 2 | DER 6424 (70 parts)/DEH 80 (30 parts) | 250 | 110 |
| 3 | Uralac 2400 (55.7 parts)/ Primid XL 552 (3.1 parts) | 500 | 110 |
| 4 | Uralac 2400 (80 parts)/ Araldite PT810 (20 parts) | 350 | 130 |
| 5 | Uralac 2504 (80 parts)/ Vestagon B1530 (20 parts) | 350 | 145 |
| 6 | Uralac 2127 (52.6 parts)/ Primid XL5 (6.2 parts) | 300 | 145 |
| 7 | Almatex PD6300 (53 parts)/ Sebacic acid (10.1 parts) | 350 | 145 |

| Composition | Dispersant injection Temp.(° C.) | Water injection. Temp.(° C.) | Particle Size(*) |
|---|---|---|---|
| 1 | 120 | 85 | 1.3 |
| 2 | 120 | 85 | 7.1 |
| 3 | 120 | 85 | 4.1 |
| 4 | 140 | 85 | 1.2 |
| 5 | 145 | 85 | 1.1 |
| 6 | 145 | 85 | 2.6 |
| 7 | 145 | 85 | 6.7 |

*-Volume average particle size (measured by Malvern Mastersizer ™), in microns

| Comp. | Solids(% non-volatiles) | Film Appearance | MEK double rubs |
|---|---|---|---|
| 1 | 26.8 | Coalesced particles | 100+ |
| 2 | 25.6 | Coalesced particles | 100+ |
| 3 | 22.0 | Coalesced particles | 100+ |
| 4 | 29.4 | Coalesced particles | 100+ |
| 5 | 22.1 | Coalesced particles | 100+ |
| 6 | 27.3 | Coalesced particles | 100+ |
| 7 | 27.9 | Coalesced particles | 100+ |

For these compositions, the polymer feed rate was 1–1.2 kg/hour, the dispersant feed rate (20% polyvinyl alcohol solution) was 0.7–1.0 kg/hour, and the water feed rate was 2–2.5 kg/hour. The dispersant and water diluent were added through different injection ports.

The compositions were applied to aluminium panels and stoved at 200° C. for 5 minutes and the solvent resistance of the coating was determined by the MEK rub test.

The MEK rub test referred to is a standard solvent resistance test which involves rubbing a surface coated with a 20 micrometer thick film of the compositions with a cloth soaked in methyl ethyl ketone, and measuring the the number of double finger rubs (a double rub is one forward and one reverse rub) to rub through the film.

Example 4

The following aqueous dispersions were made using a carboxyl functional latex as the dispersant, according to the protocol described in conjunction with Example 2 above. In this example, the polymer feed rate was 1.0 kg/hour, the dispersant feed rate (30% latex emulsion) was 0.8 kg/hour, the ammonium solution (1.4M) feed rate was 0.6 kg/hour, and the water feed rate was 1.8 kg/hour. Cymel 1123 was obtained from Dyno Cyanamid, and Nacure 1419 was obtained from King Industries.

| Comp. | Polymer Composition | Extruder Screw Speed (rpm) | Melt Temp(° C.) |
|---|---|---|---|
| 8 | Epikote 1007 (80 parts)/ Cymel 1123 (20 parts) | 350 | 110 |
| 9 | Epikote 1004 (80 parts)/ Cymel 1123 (20 parts)/ Nacure 1419 (0.2 parts) | 200 | 120 |
| 10 | Araldite GT 7072 (2 parts)/ Araldite GT 7220 (1 part)/ Dow DEH 82 (1 part) | 200 | 120 |
| 11 | Araldite GT 7072 (2 parts)/ Araldite GT 7220 (1 part)/ Dow DEH 82 (1 part) | 300 | 110 |

| Comp. | Dispersant-Injection Temp. (° C.) | Water injection. Temp.(° C.) | Particle Size(*) |
|---|---|---|---|
| 8 | 120 | 85 | 17 |
| 9 | 120 | 85 | 22 |
| 10 | 130 | 80 | 2.3 |
| 11 | 95 | 80 | 2.0 |

*Volume average particle size (microns, as measured by Malvern Mastersizer ™)

| Comp. | Solids (% non-volatiles) | Film Appearance | MEK double rubs |
|---|---|---|---|
| 8 | 24 | Coalesced particles | 65 |
| 9 | 25 | Coalesced particles | 70 |
| 10 | 33 | Partially coalesced particles | 65 |
| 11 | 30 | Coalesced particles | 100+ |

The latex used was a styrene/ethylacrylate/methacrylic acid (40/30/30) latex, with a calculated $T_g$ of 73° C. and an acid value of 194 mg KOH/gram of polymer. This was prepared as follows.

| Material | Weight (g) |
|---|---|
| Aqueous charge | |
| Deionised water | 4015.2 |
| Aerosol OT75 | 11.2 |
| Monomer feed | |
| Styrene | 1382.7 |
| Ethyl acrylate | 1037.0 |
| Methacrylic acid | 1037.0 |
| Aerosol OT75 | 22.4 |
| Primary octyl mercaptan | 68.8 |

-continued

| Material | Weight (g) |
|---|---|
| Seed Initiator | |
| Deionised water | 124.8 |
| Ammonium persulphate | 17.6 |
| Feed Initiator | |
| Deionised water | 248.8 |
| Ammonium persulphate | 34.4 |

In the preparation method, the aqueous charge is heated to 80° C. under a nitrogen blanket, and 10% of the monomers are added. This is then held for 10 minutes. A shot of the seed initiator is then added, and the temperature raised to 85° over a period of 30 minutes. Then the monomer and initiator are fed in linearly over 3 hours, and the mixture is then held at 85° C. for 1 hour. The composition is then cooled to room temperature and filtered. The result is a fluid milky latex, which was used as a dispersant after being neutralised in the dispersion process.

Example 5

The following pigmented aqueous dispersions were made according to the protocol generally described above in conjunction with example 2. In this example, the polymer feed (Elvacite 2810 (40 parts)/Vestagon B1350 (17 parts)/ $TiO_2$ TR-60 (39 parts)) rate was 1 kg/hour, the dispersant (30% latex emulsion) feed rate was 0.5 kg/hour, the ammonium solution (1.4M) feed rate was 0.6 kg/hour, and the water feed rate was 2.0 kg/hour.

The extruder screw speed was 250 rpm, the melt temperature was 150° C., and the dispersant injection temperature was 150° C. The water injection temperature was 90° C. The average volume particle size was 0.4 microns, which was thought in part to be due to the presence of the titanium dioxide, and was actually 2 microns when measured by optical microscopy. The solids content (% non-volatiles) was 26.2.

The particulate dispersion so obtained was spray dried using a Buchi Spray Dryer to yield a free flowing powder with a volume average particle size of 14 microns, with this in part being due to particle agglomeration which has occurred during the spray drying process.

Example 6

The following non-aqueous dispersion was made according to the protocol described in example 1. The following process conditions were used. The polymer feed rate was 2.0 kg/hour, and the dispersant (10% polybutadiene-graft-acrylic copolymer in isohexadecane) feed rate was 1.0 kg/hour, and the isohexadecane (ex. Bayer) feed rate was 2 kg/hour.

The polymer composition was Araldite GT 7072 (2 parts), Araldite GT 7220 (1 part) and Dow DEH 82 (1 part). The extruder screw speed was 250 rpm, the melt temperature was 120° C., and the dispersant injection temperature was 130° C. The isohexadecane injection temperature was 120° C., the average volume particle size was 15.1 microns, and the % non volatile solids was 44.

The dispersant in this example was made as follows.

| | Parts |
|---|---|
| Charge 1 | |
| Toluene | 396.14 |
| Polybutadiene (Lithene N4 5000, ex. Revertex) | 199.74 |
| White Spirit | 197.74 |
| Charge 2 | |
| Methyl methacrylate | 187.74 |
| Methacrylic acid | 11.98 |
| Lucidol P25 (25% aq benzoyl peroxide) | 5.33 |

Charge 2 was added to charge 1 over a period of 1.5 hours at a reflux temperature of 120–125° C. After a further 30 minutes, Trigonox 21B 70 (tertiary butyl per-2-ethylhexanoate, ex. Ciba Chemicals, 1.33 parts) was added, and heating was continued for a further hour. Solvent (99.1 parts) was removed by distillation, and replaced by an equal volume of white spirit.

The product was opalescent, with a viscosity of 0.5–1.0 Pas and a measured solid content of 37%

Example 7

Compositions 1–11 above were further examined using Differential Scanning Calorimetry (DSC) and data is given in table below. According to the test method, the sample polymer is accurately weighed into an aluminium DSC pan. The lid of this is pierced four times, and the lid and pan assembly are crimped together. The crimped pan is placed into the cell of the DSC (TA Instrument 2000), and scanned from −50° C. to 300° C. at a temperature change rate of 10° C. per minute. The thermogram for the Tg step transition is analysed, and the area of the reaction peak integrated. The DSC trace for Composition 11 is shown as FIG. 1. FIG. 1 indicates that the polymer of Composition 11 has a Tg of 55.3° C. and a heat of reaction of 87.2 J/g attributable to residual reactivity.

| Composition | Heat of reaction of extrudate (J/g) |
|---|---|
| 1 | 34.8 |
| 2 | 69.8 |
| 3 | (Not detected) |
| 4 | 10.5 |
| 5 | 14.3 |
| 6 | 36.6 |
| 7 | 42.8 |
| 8 | 6.4 |
| 9 | 14.4 |
| 10 | 45.2 |
| 11 | 87.2 |

Composition 3 does not appear to lend itself to this method of analysis. Compositions 10 (processed at relatively high temperature) and 11 (processed at lower temperature) show the influence of process temperature upon the measured heat of reaction, and this is also reflected in the quality of the films, with composition 10 yielding a film of partially coalesced particles.

Example 8

It was attempted to produce the following comparative composition.

A solid blend (80 parts) of two resins and a cross linker (Araldite GT 7072, 49 parts, Araldite GT 7220, 24 parts, and Dow DEH 82, 27 parts) together with butyl Cellosolve (50 parts) were heated in a round bottom flask fitted with a mechanical stirrer. The temperature was raised to 70° C.

To this mixture a solution of acid functional acrylic polymer in butyl cellosolve (at 60% nv) was added (30 parts), with vigorous stirring. The acrylic solution polymer was prepared in a manner similar to that described in U.S. Pat. No. 5,087,645 referred to above, and had a composition of methylmethacrylate/butyl acrylate/acrylic acid with a ratio 46.2:44.4:9.3 respectively.

To the above mixture dimethylaminoethanol (2 parts) was added, and the mixture was continuously agitated vigorously. Afterwards water (37 parts) was added to yield a milky dispersion, and it was then cooled by placing an ice bath underneath the flask.

The dispersion was left overnight to allow most of the particles to sediment, forming a layer at the bottom. This bottom layer of product was isolated, and left to dry under ambient conditions. It was found that the resulting product was a continuous resinous mass, which could not be transformed into a free flowing powder state, due to the presence of solvents used in the processing steps.

In a further comparative example, a solvent free version of the above comparative example was attempted. It was found that upon heating the solid resins/crosslinker blend (Araldite GT 7072, 49 parts, Araldite GT 7220, 24 parts, Dow DEH 82, 27 parts) the system crosslinked and became impossible to process.

What is claimed is:

1. A continuous process for preparing a reactive particulate dispersion in a liquid carrier which comprises mixing together under extrusion conditions to form a molten mixture a resin and a crosslinker under shear at a temperature and for a time such that substantial crosslinking potential is retained between the resin and the crosslinker and thereafter dispersing the mixture whilst still molten into the liquid carrier and allowing the molten dispersed mixture to solidify to form particles.

2. A process according to claim 1, wherein the process is carried out in the absence of a volatile organic solvent.

3. A process according to claim 1 or claim 2, wherein a liquid carrier is used which is immiscible with the particles.

4. A process according to any one of the preceding claims wherein the resin and crosslinker are selected from epoxy, polyphenol, polyester, blocked isocyanate, hydroxyalkylamide crosslinker, amino resin, hydroxyl functional polymer and carboxy functional polymer or crosslinker.

5. A process according to claim 4 in which the resin and crosslinker are selected from epoxy, polyphenol, polyester and amino resin.

6. A process according to any one of the preceding claims, wherein the liquid carrier is water or a hydrocarbon.

7. A process according to any one of the preceding claims, wherein the step of melting and mixing the resin and the crosslinker and the step of dispersing are carried out sequentially in a continuous process.

8. A process according to any one of the preceding claims, wherein the melting, mixing and dispersing steps are carried out in an extruder.

9. A process according to claim 7 wherein the extruder is a twin screw extruder.

10. A process according to any one of the preceding claims, wherein the particles are subsequently separated from the liquid carrier.

11. A dispersion of reactive particles in a liquid carrier, wherein the dispersed particles comprise reactive particles of a resin and a crosslinker, wherein the particles have a blocking temperature of at least 40° C., are free of a solvent in which the resin is miscible, and are substantially spherical, wherein the resin/crosslinker system is an acid/epoxy, epoxy/amino resin, polyphenol/epoxy, phenol formaldehyde/epoxy, epoxy/amide, isocyanate/hydroxy, carboxy/hydroxyalkylamide or hydroxyl/epoxy system, said particles comprising a free-flowing powder upon removal of said carrier.

12. A dry free-flowing powder comprising dispersed particles prepared by a process comprising mixing together under extrusion conditions to form a molten mixture a resin and a crosslinker under shear at a temperature and for a time such that substantial crosslinking potential is retained between the resin and the crosslinker and thereafter dispersing the mixture whilst still molten into a liquid carrier and allowing the molten dispersed mixture to solidify to form particles, wherein the particles are subsequently separated from the liquid carrier.

13. A continuous process for preparing a reactive particulate dispersion in a liquid carrier in an extruder equipped with a main intake, an exit port, and an intermediate liquid injection port between the main intake and the exit port, and heating means for heating material as it passes through the extruder between the main intake and the liquid injection port, in which a resin and a cross linker are introduced into the extruder through the main intake, and are heated and mixed together as they pass through the extruder so as to form a molten mixture before they reach the liquid injection port, and a liquid carrier is introduced into the extruder through the injection port, and the molten mixture becomes dispersed in the liquid medium, the temperature and the throughput of the extruder being such that substantial crosslinking potential between the resin and the crosslinker remains in the final dispersion, and the dispersion is allowed to cool on leaving the extruder such that the molten mixture solidifies to form a particulate dispersion.

14. A dispersion according to claim 11 wherein each of the reactive particles comprises a homogeneous mixture of resin and crosslinker throughout the particle.

15. A dry free-flowing powder comprising substantially spherical particles obtained by removal of the carrier liquid from the dispersion of claim 11.

* * * * *